United States Patent
Anatrini

(10) Patent No.: US 12,024,322 B2
(45) Date of Patent: Jul. 2, 2024

(54) APPARATUS FOR EXTRACTING PHARMACEUTICAL CONTAINERS FROM SUPPORT ELEMENTS

(71) Applicant: MARCHESINI GROUP S.P.A., Pianoro (IT)

(72) Inventor: Dario Anatrini, Siena (IT)

(73) Assignee: Marchesini Group S.P.A. (IT)

(*) Notice: Subject to any disclaimer, the term of this patent is extended or adjusted under 35 U.S.C. 154(b) by 792 days.

(21) Appl. No.: 17/252,095

(22) PCT Filed: Jun. 14, 2019

(86) PCT No.: PCT/IB2019/055003
§ 371 (c)(1),
(2) Date: Dec. 14, 2020

(87) PCT Pub. No.: WO2019/243975
PCT Pub. Date: Dec. 26, 2019

(65) Prior Publication Data
US 2021/0253279 A1    Aug. 19, 2021

(30) Foreign Application Priority Data
Jun. 20, 2018   (IT) .................. 102018000006483

(51) Int. Cl.
*B65B 3/00* (2006.01)
*B65B 43/46* (2006.01)
(Continued)

(52) U.S. Cl.
CPC .............. *B65B 3/003* (2013.01); *B65B 43/46* (2013.01); *B65B 55/027* (2013.01); *B65G 47/90* (2013.01); *B65G 2201/0235* (2013.01)

(58) Field of Classification Search
CPC ..... B65B 3/003; B65B 43/461; B65B 55/027; B65G 47/90; B65G 2201/0235
(Continued)

(56) References Cited

U.S. PATENT DOCUMENTS

| 10,829,252 B2* | 11/2020 | Trilli ..................... B65B 55/027 |
| 2018/0134423 A1 | 5/2018 | Narvekar et al. |
| 2018/0229866 A1* | 8/2018 | Eberhardt ............. B65B 65/003 |

FOREIGN PATENT DOCUMENTS

| DE | 9218611 U1 | 11/1994 |
| DE | 19513552 A1 | 10/1996 |

(Continued)

*Primary Examiner* — Robert F Long
*Assistant Examiner* — Xavier A Madison
(74) *Attorney, Agent, or Firm* — Endurance Law Group PLC

(57) ABSTRACT

Apparatus for extracting pharmaceutical containers from a nest inside a tub includes an advancement line of the tubs, which stops the tubs at a rest station; a handling organ, and a pickup and transfer station. The station has a frame, with a housing for receiving and supporting a nest and rotatable about a first axis into a first operating position near the rest station and into a second operating position near the handling organ. A suction gripper collects at least a further nest containing pharmaceutical containers from a tub in the rest station and positions the further nest in the housing of a second frame stationary in the first operating position. The second frame then rotates into the second operating position for the handling organ to collect the pharmaceutical containers from the "nest."

16 Claims, 13 Drawing Sheets

(51) Int. Cl.
*B65B 55/02* (2006.01)
*B65G 47/90* (2006.01)

(58) Field of Classification Search
USPC .......................................................... 53/48.1
See application file for complete search history.

(56) References Cited

FOREIGN PATENT DOCUMENTS

| | | |
|---|---|---|
| WO | WO2016/198391 A1 | 12/2016 |
| WO | WO2018/011748 A1 | 1/2018 |

* cited by examiner

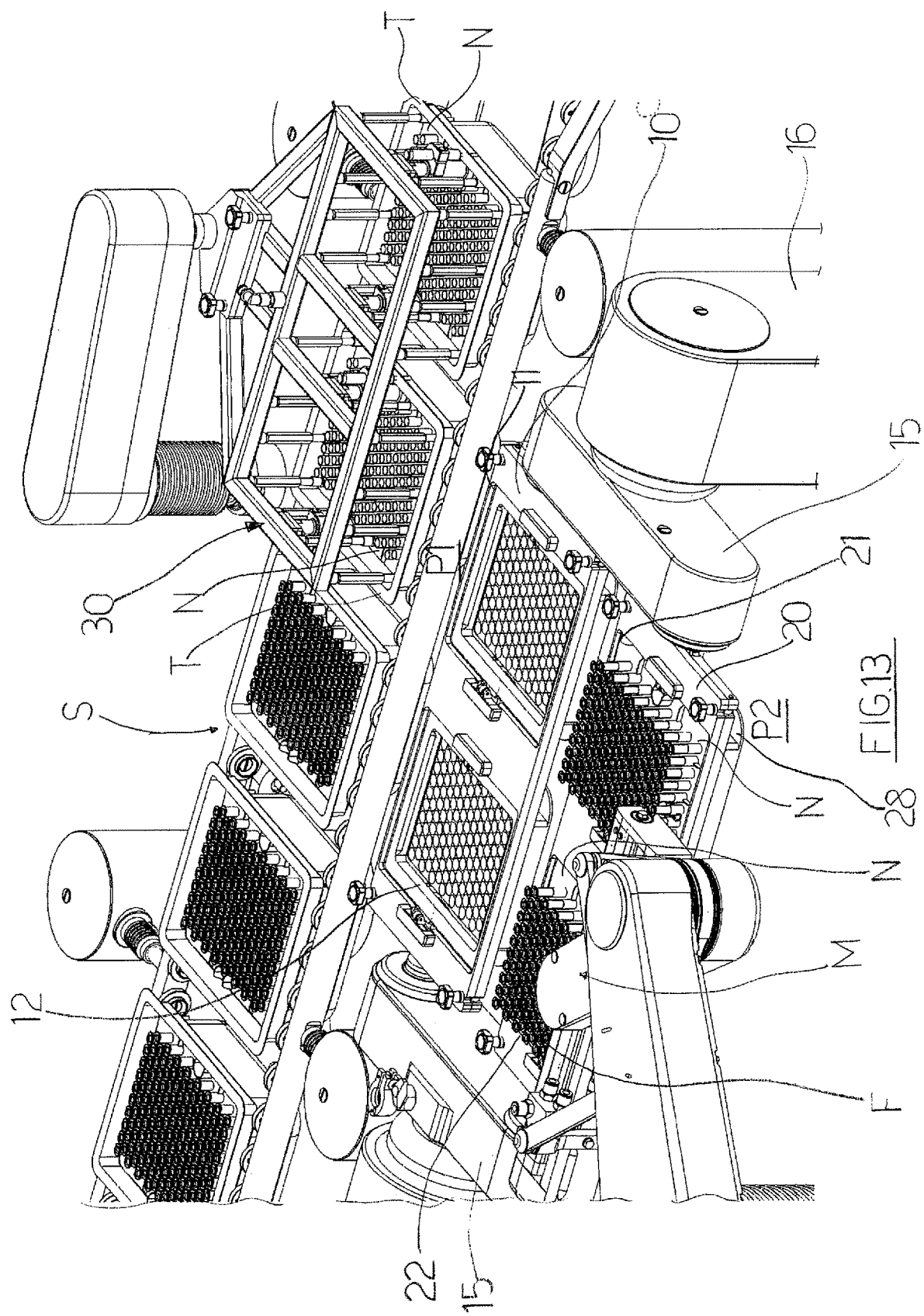

APPARATUS FOR EXTRACTING PHARMACEUTICAL CONTAINERS FROM SUPPORT ELEMENTS

FIELD OF THE INVENTION

The present invention relates to the particular technical sector concerning packaging pharmaceutical substances or products internally of relative containers, such as, in particular, syringes, bottles and the like.

DESCRIPTION OF THE PRIOR ART

It is known that pharmaceutical containers, such as syringes, carpules, bottles, which are to be filled, are usually predisposed in groups of rows and inserted in relative support elements which are then packed inside sterile packages.

The sterile packages are then supplied to pharmaceutical producers who utilise machines for carrying out the filling of the containers with the pharmaceutical substances or products and the subsequent closure thereof.

The present invention concerns in particular an apparatus for extracting pharmaceutical containers, such as syringes, carpules or vials, from relative support elements constituted by a tub and a nest.

In the case of pharmaceutical containers constituted by syringes, carpules or vials, the support elements can consist in the combination of two elements: a first element, called a nest, for the support of the syringes, carpules or vials, and a second element, called a tub, in which the nest is positioned.

The nest is a sort of rack having a plurality of through-seats having a shape and dimensions that are such as to support the syringes, carpules or bottles, while the tub is a tray in which the nest is inserted.

The syringes, carpules or vials are inserted and housed in the seats of the nest in such a way that the relative mouths for the inserting of the pharmaceutical substance or product are facing upwards.

The tubs, with the nests inside, bearing the syringes, carpules or vials, are sealed by use of a protective film and then are packed in sterile conditions internally of one or more casings.

Pharmaceutical producers then receive these types of sterile packages, with the pharmaceutical containers inside predisposed in the relative support elements, constituted by the tubs with the nests internally thereof.

The pharmaceutical producers therefore have to proceed to opening the packs, opening the casings and removing the sealing film.

Thereafter the extraction operations of the pharmaceutical containers from the relative support elements, i.e. the nests present in the tubs, have to be carried out, as well as the transfer of the pharmaceutical containers to specific work stations for carrying out the filling and sealing thereof in sterile conditions.

The extraction operations are very delicate as they must be carried out at quite a high velocity, in order to ensure a suitable frequency of infeed of the containers to the filling and closing stations, and with non-invasive modalities so as to avoid, or at least limit as far as possible, any situations or movements of the bottles which can expose them to causes of contamination.

SUMMARY OF THE INVENTION

The aim of the present invention is therefore to describe an apparatus for extracting pharmaceutical containers such as syringes, carpules or bottles, which are arranged with the mouths thereof facing upwards, internally of relative support elements constituted by a tub and a nest, able to carry out the extraction operations in a rapid and effective way, without the containers being exposed to any risk, or at least with a minimum risk, of any external contaminations caused by the movement of the containers themselves and/or by the movement of operating organs or elements.

The above aim is obtained by means of an apparatus for extracting pharmaceutical containers such as syringes, carpules or bottles, from relative support elements, constituted by a tub and a nest, according to claim 1.

Further and advantageous characteristics of the apparatus of the present invention are set down in the various claims dependent on claim 1.

BRIEF DESCRIPTION OF THE DRAWINGS

The characteristics of a preferred, but not exclusive, embodiment of the apparatus for extracting pharmaceutical containers, being syringes, carpules or bottles, from relative support elements constituted by a tub and a nest, of the present invention, will be described in the following with reference to the appended tables of drawings, in which.

Figure 1:
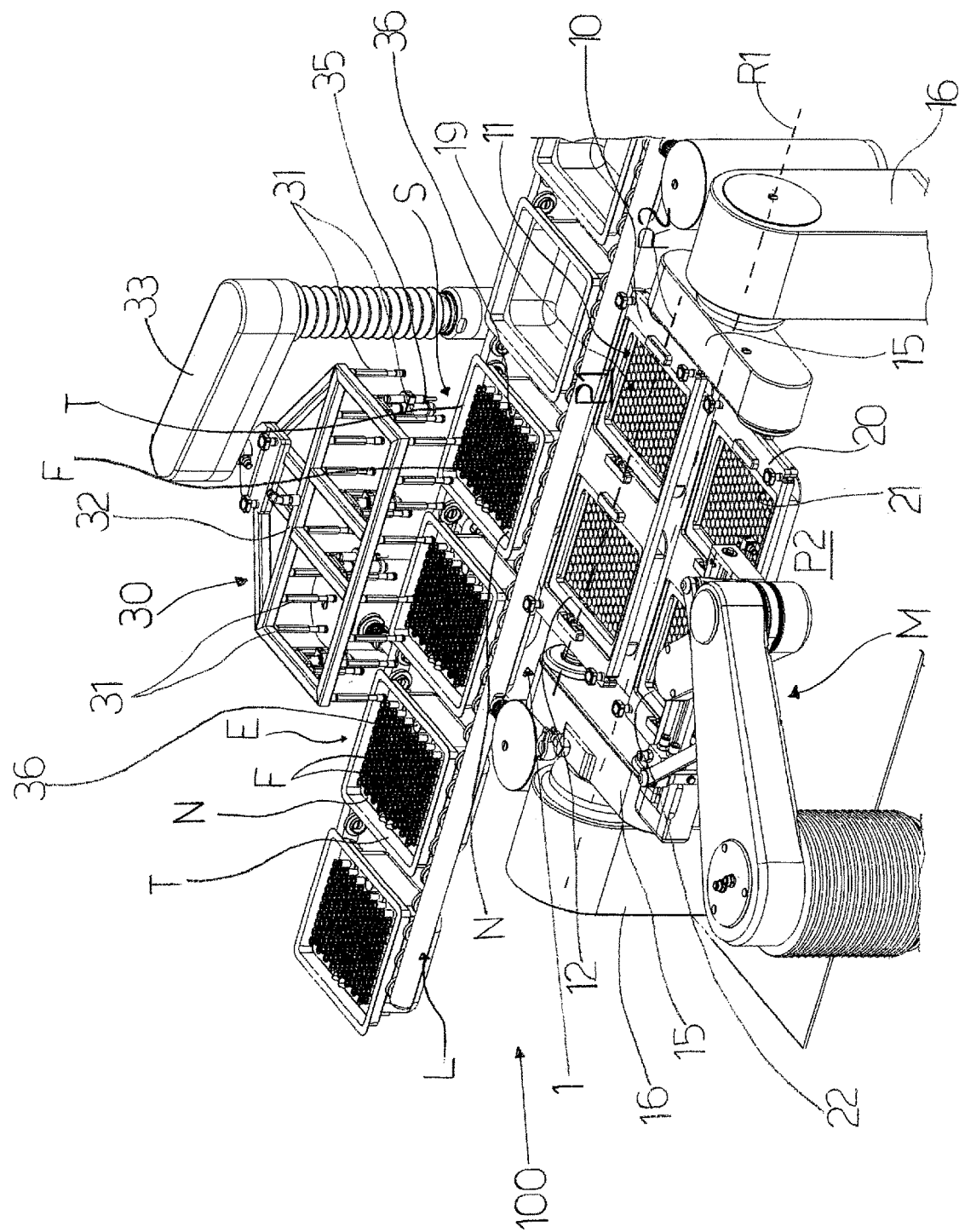
FIG. 1 is a schematic perspective view of the apparatus of the invention for extracting pharmaceutical containers, such as for example syringes, from relative support elements which are constituted by a tub and a nest, object of the invention, in a non-operative position.
Figure 2:
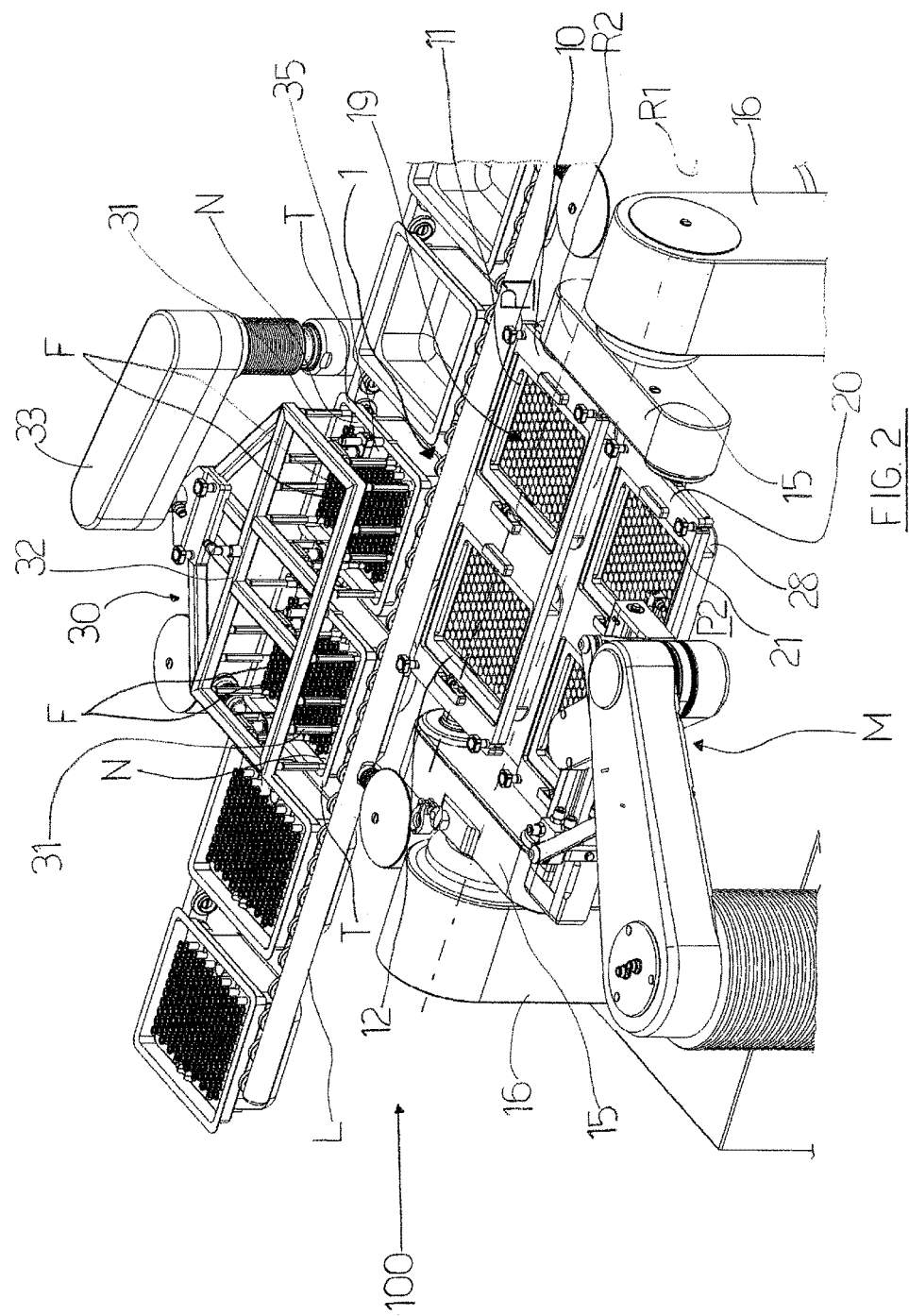

FIGS. from 2 to 13 illustrate, in schematic perspective views, a possible succession of operating steps of the apparatus of the invention, for extracting pharmaceutical containers from the relative nests contained in relative tubs.

DESCRIPTION OF THE PREFERRED EMBODIMENTS

With reference to the accompanying tables of drawings, reference numeral (100) denotes the apparatus for extracting pharmaceutical containers (F), such as syringes, carpules, bottles and the like, from relative support elements (E) of the present invention, in its entirety.

The apparatus (100) is designed to carry out the extraction of pharmaceutical containers (F) to be filled, such as syringes, carpules, vials and the like, which are arranged and packaged internally of support elements (E) constituted by a nest arranged internally of a tub.

In particular, the apparatus (100) is designed and structured to extract pharmaceutical containers to be filled which are arranged and supported by the nest in such a way as to have the relative mouths facing upwards, for insertion of a pharmaceutical substance or product.

Therefore, with this type of support elements (E), and with this arrangement of the bottles (F), the operations of extraction, and therefore the following operations of transfer towards the stations for filling and closing them, must be carried out by handling the pharmaceutical containers in such a way that they always have a same orientation, i.e. with the relative mouths facing upwards and, consequently, exposing them to the lowest possible number of causes of contamination.

The apparatus (100) of the present invention comprises: an advancement line (L), for advancing the tubs (T), with the nests (N) inside them containing the pharmaceutical containers (F) to be filed, and for stopping the tubs at a rest station (S); a handling organ (M), a pickup and transfer station (1), for picking up the nests (N) containing the pharmaceutical containers (F) from the tubs (T) which have been positioned by the advancement line (L) in the rest station (S).

In particular, the pickup and transfer station (1) comprises: at least a frame (10) conformed in such a way as to have at least a housing (11) having a shape and dimensions such as to be able to receive and support a nest (N) with the pharmaceutical containers (F) inside, and gripping means (30) by suction, configured to collect, by suction, at least a nest (N) containing the pharmaceutical containers (F) from a relative tub (T) positioned by the advancement line (L) at the rest station (S).

More in particular:

the frame (10) is predisposed in such a way as to be activatable in rotation about a first rotation axis (R1) in order to be positionable in a first operating position (P1), in which the housing (11) is situated in proximity of the rest station (S) of the advancement line (L) (see FIGS. from 1 to 5, and also FIGS. from 11 to 13), and in a second operating position (P2) in which the housing (11) is in proximity of the handling organ (M) (see FIGS. from 6 to 10), while the gripping means (30) by suction are further configured and activatable, when the frame (10) is positioned in the first operating position (P1), in order to extract, retaining by suction, the nest (N) containing the pharmaceutical containers (F) from the tub (T) and to transfer, position and release the nest (N) in the housing (11) of the frame (10) (see figures from 2 to 5).

Figure 6:
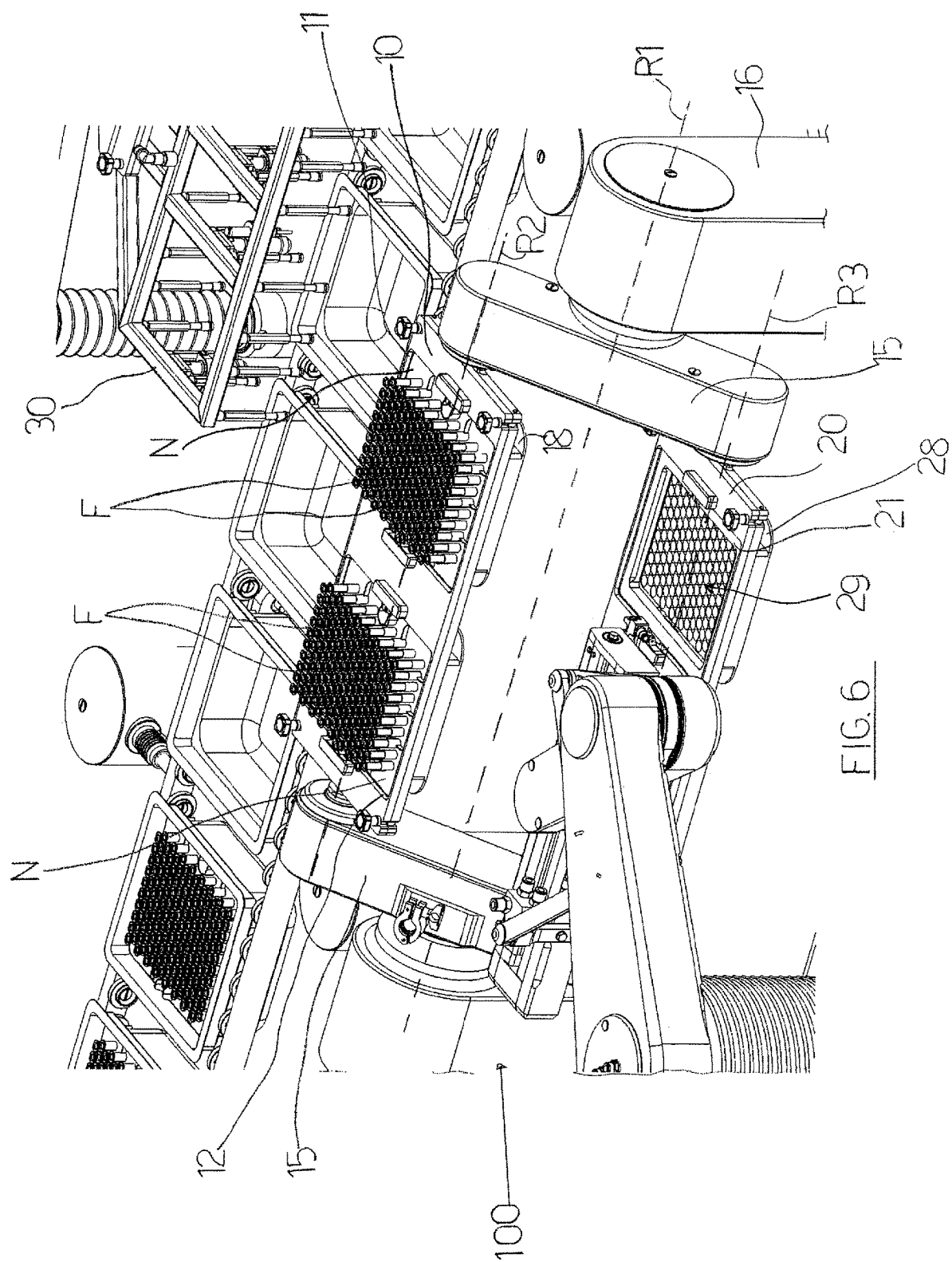
Figure 7:
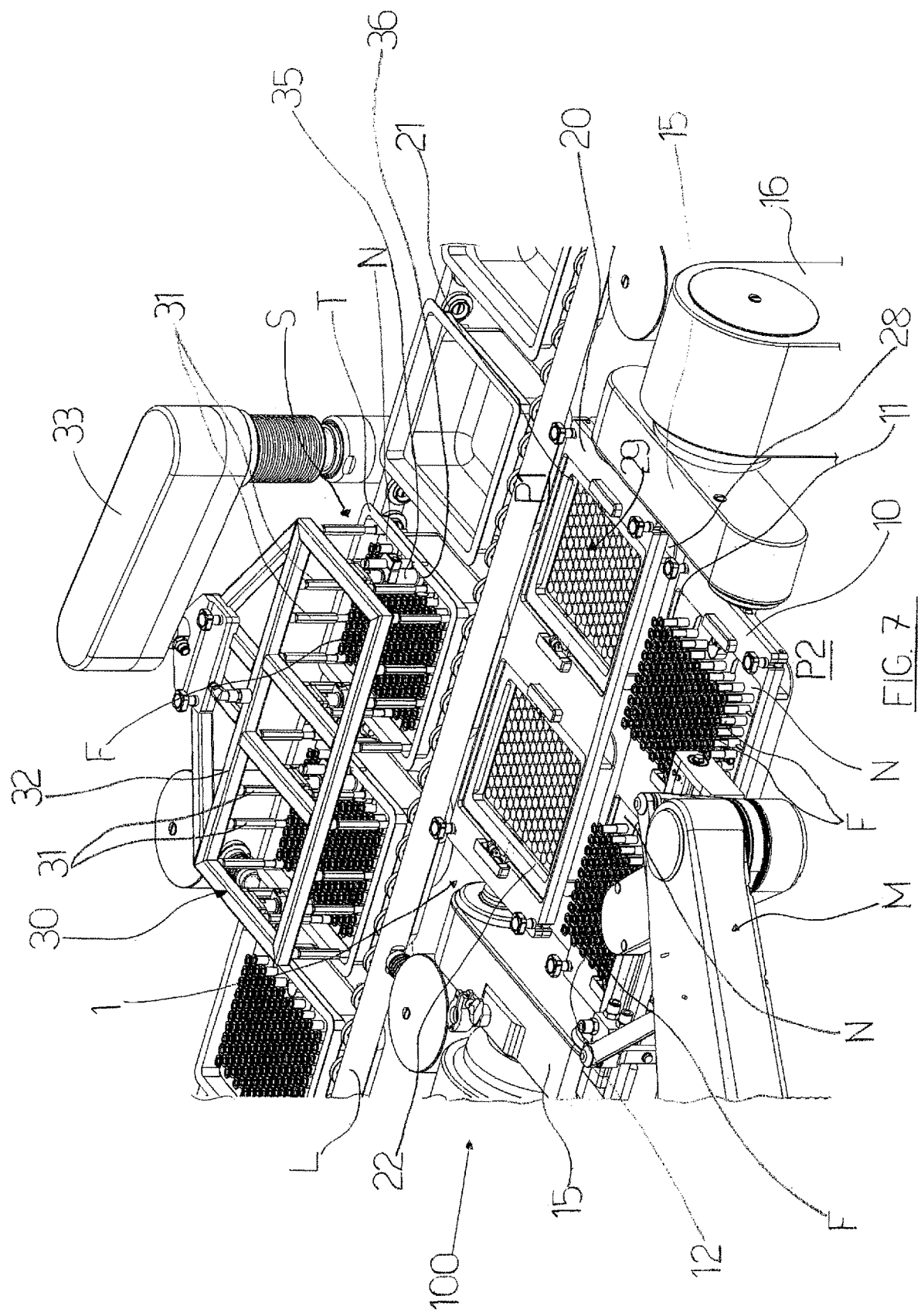

Further, the frame (10), once the gripping means (30) have positioned and released the nest (N) containing the pharmaceutical containers (F) in the housing (11), is activatable in rotation about the first rotation axis (R1) so as to be positioned in the second operating position (P2) so that the housing (11), with the nest (N) containing the pharmaceutical containers (F), is in proximity of the handling organ (M) (see FIGS. 6 and 7).

An important peculiarity consists in the fact that the frame (10) is also configured and predisposed so that, during the rotation about the first rotation axis (R1) from the first operating position (P1) to the second operating position (P2), the frame (10) can also be set in rotation about a second rotation axis (R2) parallel to the first rotation axis (R1), so that the housing (11), and therefore the nest (N) containing the pharmaceutical containers (F), remains parallel to and constantly maintains a same orientation with respect to the first rotation axis (R1) during the displacement from the first operating position (P1) to the second operating position (P2) (see in particular FIG. 6).

Figure 8:
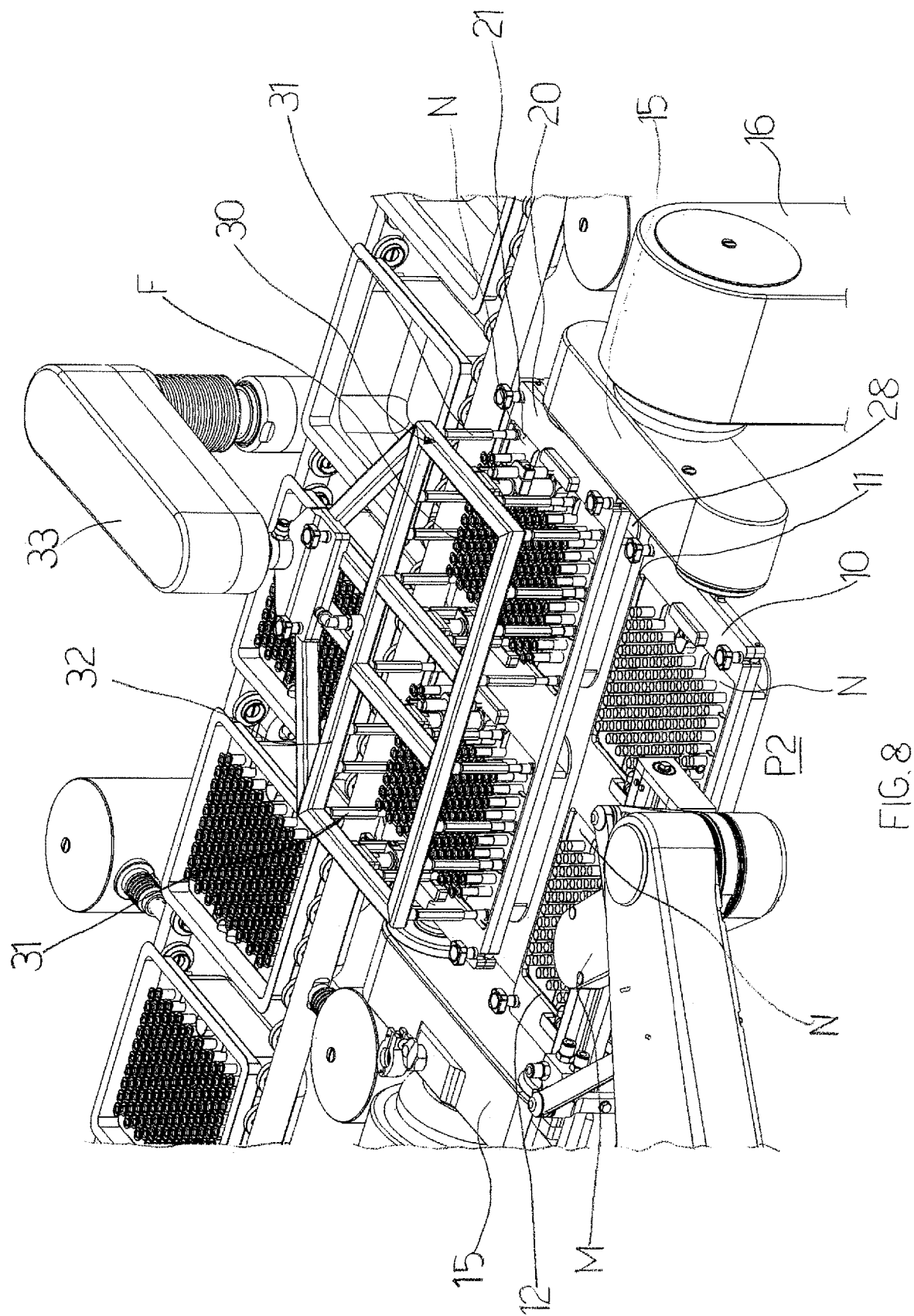

Lastly, the handling organ (M) is predisposed and configured to grip, handle, move and release the pharmaceutical containers (F), so that, when the frame (10) has been positioned in the second operating position (P2) with the relative housing (11) containing the nest (N) with the pharmaceutical containers (F) (see for example FIGS. 7 and 8), the handling organ (M) can be activatable to grip a group of pharmaceutical containers (F) and extract them from the nest (N) and repeat such operations up to completely emptying the nest (N).

In particular, the handling organ (M) is predisposed and configured to pick up groups of pharmaceutical containers (F) time by time from the nest (N), for example a complete row of pharmaceutical containers (F) arranged in the nest, and transfer them, still with the relative mouths facing upwards, to a filling station (not illustrated in the figures as not being a part of the invention) predisposed to carry out the filling with a pharmaceutical product or substance.

Thanks to the frame (10) having at least one housing (11) for receiving and supporting at least a relative nest (N) containing pharmaceutical containers (F) to be filled, and activatable in rotation about a rotation axis (R1) from the first operating position (P1), in proximity of the rest station (S), to the second operating position (P2), in proximity of the handling organ (M), the apparatus (100) is able to transfer the nest with the pharmaceutical containers, once it has been picked up from the tub and positioned in the housing (11) by the gripping means (30), rapidly and effectively in proximity of the handling organ (M) which must then pick up the pharmaceutical containers and transfer them to the filling station.

During this transfer there are no operating organs that act above the nest and therefore the pharmaceutical containers; further, the duration of the intervention and use of the gripping means (30) by suction is extremely limited in time and space, as they intervene only in order to extract the nest from the tub in the rest station along the advancement line and position the nest in the housing of the frame which is located exactly in proximity of the rest station, thus dispensing with the need to carry out long transfer paths with the nest hung therefrom.

Other advantageous characteristics of the apparatus of the invention are set down in the following.

With the purpose of preventing the pharmaceutical containers borne by the nest during the movement of the frame (10) from the first operating position (P1) to the second operating position (P2) from being subject to or exposed to eventual causes of contamination, the frame (10) is further configured and predisposed in such a way that, in order to be movable from the first operating position (P1) to the second operating position (P2), the frame (10) is activatable about the first rotation axis (R1) according to a curved trajectory with a prefixed rotation direction so that the frame (10), and therefore the housing (11) with the nest (N) containing the pharmaceutical containers (F), is first raised with respect to the advancement line (L) and then lowered, in order to be positioned in the second operating position (P2) in proximity of the handling organ (M) (see for example FIG. 6).

Figure 10:
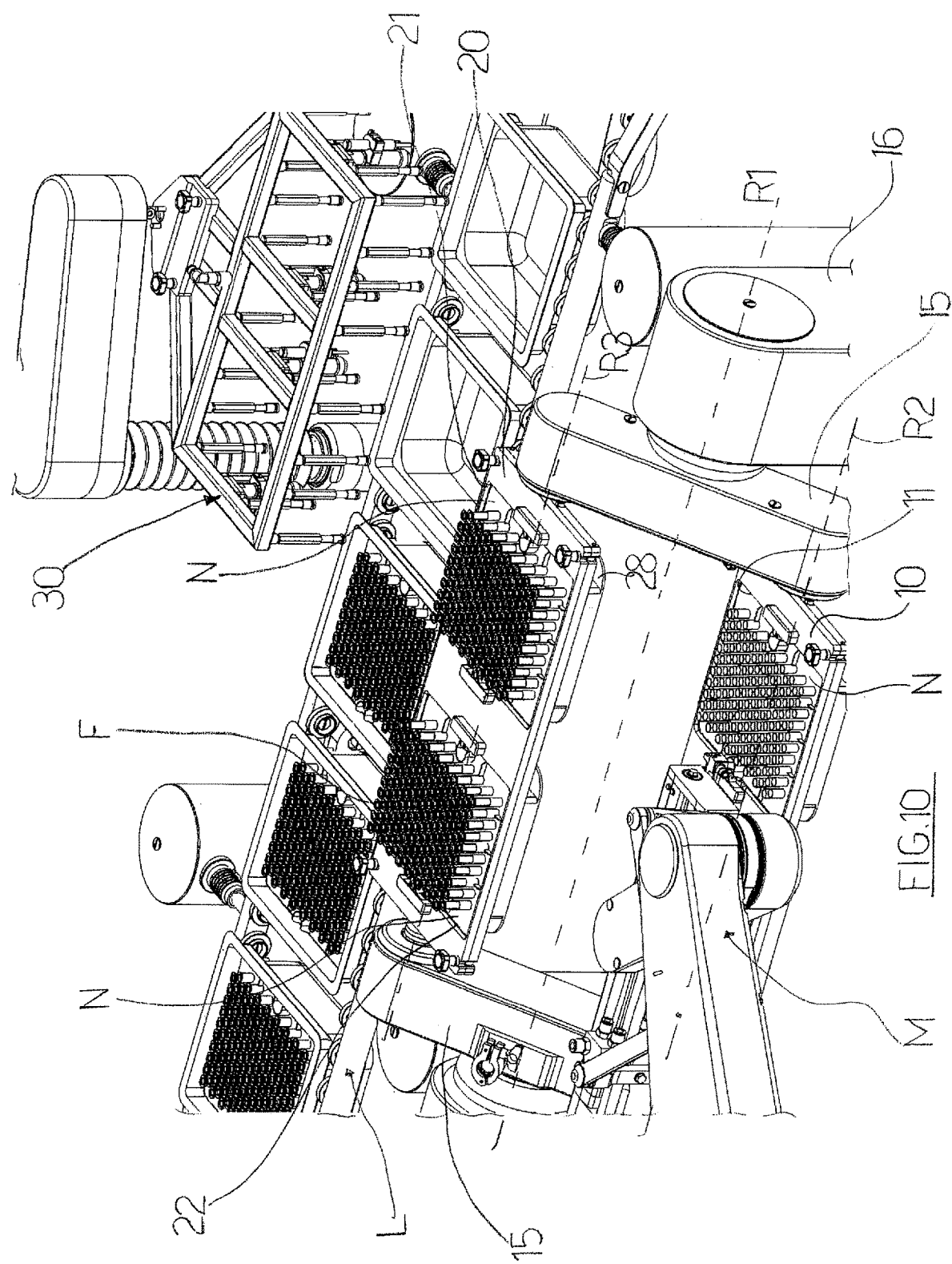

Further, the frame (10) is configured and predisposed in such a way that, in order to be movable from the second operating position (P2) to the first operating position (P1), after the handling organ (M) has collected all the pharmaceutical containers (F) and emptied the nest (N) borne by the housing (11) of the frame (10) positioned in the second operating position (P2), the frame (10) is activatable about the first rotation axis (R1) always in the prefixed rotation direction according to a curved trajectory so that the frame (10), and therefore the housing (11) with the emptied nest (N), is first lowered and then raised so as to be positioned in the first operating position (P1) in proximity of the rest station (S) of the advancement line (L) (see for example FIG. 10).

A further advantageous aspect of the apparatus of the invention consists in the fact that the gripping means (30) by suction are further configured in such a way that, when the frame (10) with the housing (11) containing the emptied nest (N) is returned into the first operating position (P1), the gripping means (30) are activatable to grip by suction the emptied nest (N), extract it from the housing (11) and reposition it in the tub (T) on the advancement line (L) from which it had previously been extracted.

In this way, the advancement line (L) can advance the tub with the empty nest inside downstream, to a suitable packing station (not illustrated as not an object of the present invention), at which the pharmaceutical containers that had been collected from the nest using the handling organ (M), and then filled and closed, can be newly relocated in the same nest.

In the preferred embodiment illustrated in the figures, the frame (10) is borne by a pair of arms (15), the pair of arms (15) being rotatably mounted on relative support elements (16) so that the pair of arms (15) is activatable in rotation with respect to the support elements (16) about the first rotation axis (R1) so that, with the rotation of the pair of arms (15) with respect to the support elements (16), the frame (10) can be activated in rotation about the first rotation axis (R1) and moved from the first operating position (P1) to the second operating position (P2) and vice versa.

Further, the frame (10) is mounted on the pair of arms (15) in such a way as to be rotatable with respect to the pair of arms (15) according to the second rotation axis (R2), so that, during the movement from the first operating position (P1) to the second operating position (P2), and vice versa, the frame (10), and therefore the relative housing (11), remains parallel and keeps the same orientation with respect to the first rotation axis (R1).

Figure 3:
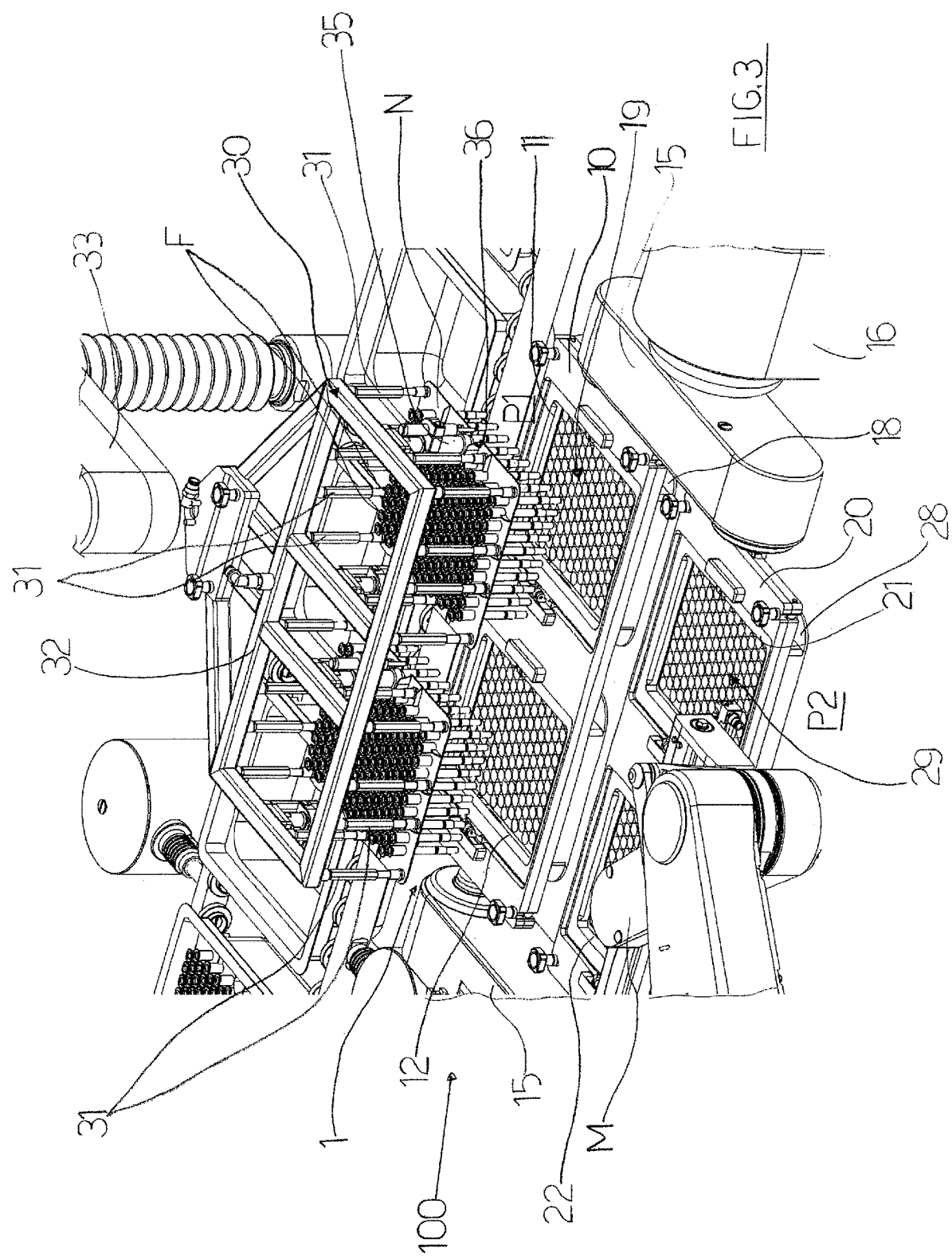
Figure 4:
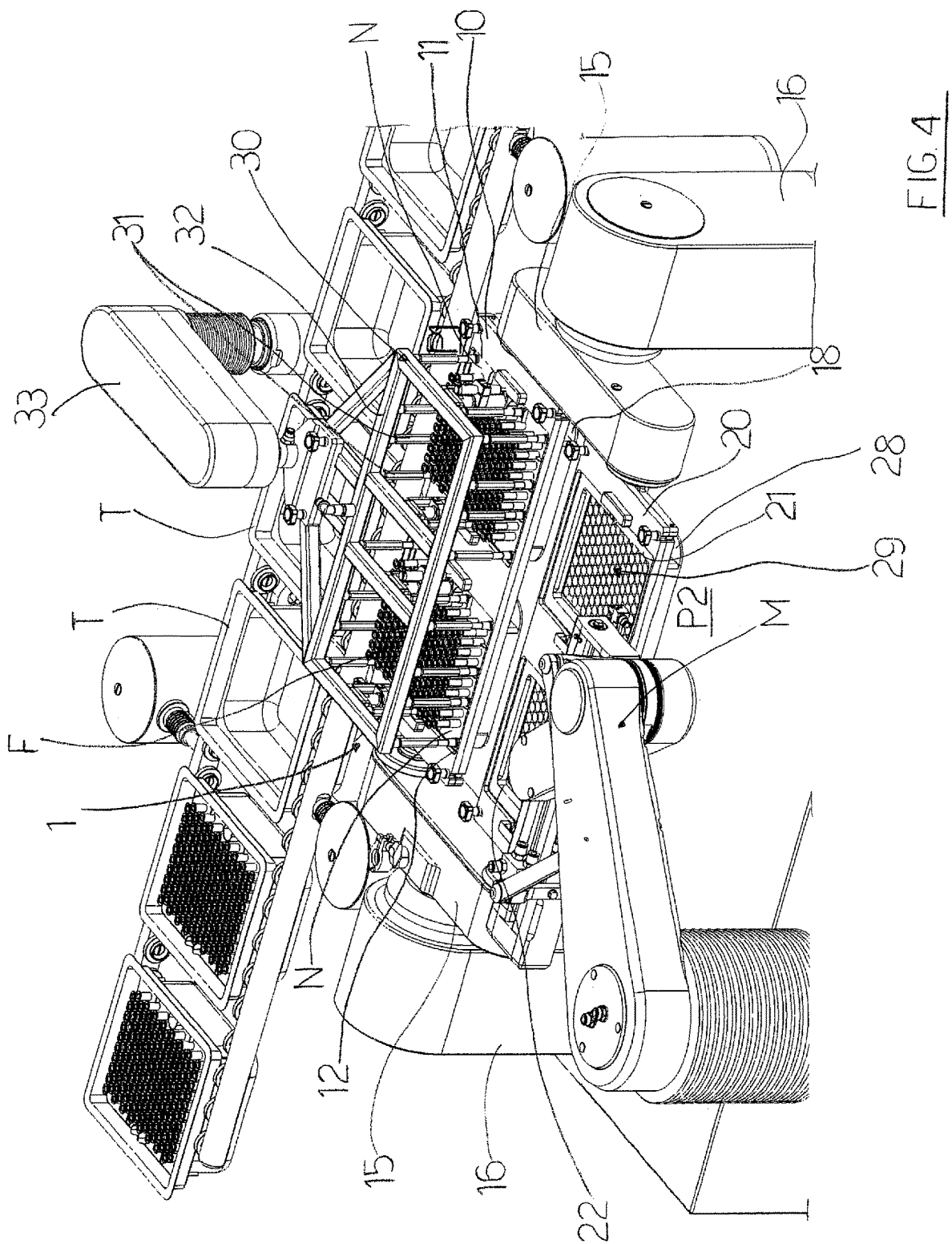

In a further advantageous aspect of the apparatus of the invention, the frame (10) comprises a rest plane (18) (see for example FIGS. 3,4, 5) predisposed inferiorly of the housing (11) at a distance such that, when the frame (10) is in the first operating position (P1) and the nest (N) containing the pharmaceutical containers (F) is positioned by the gripping means (30) in the housing (11), the lower end of the pharmaceutical containers (F) abuts the rest plane (18) so that the pharmaceutical containers (F) are partially raised with respect to the nest (N) so that an upper part thereof projects from the nest (N) to facilitate gripping thereof by the handling organ (M).

A further advantageous aspect consists in the fact that the second frame (10) comprises a matrix of centring through-seats (19) predisposed in the relative housing (11), above the rest plane (18).

Each of the through-seats (19) is destined to house, and enable free passage of, relative pharmaceutical containers. (F) when the nest (N) containing the pharmaceutical containers (F) is positioned by the gripping means (30) in the housing (11) of the second frame (10), so as to maintain the pharmaceutical containers (F) correctly orientated during the movement of the second frame (10) from the first operating position (P1) to the second operating position (P2).

In the preferred embodiment illustrated in the figures, the gripping means (30) by suction comprise a series of tubular suction elements (31), which are borne by a support structure (32) activatable and movable in space by means of a movable arm (33).

In particular, the tubular suction elements (31) are borne by the support structure (32) so as to be arranged in an orientation and arrangement such as to be able to act at the peripheral edges of the nests (N) for gripping them by suction.

Further, the gripping means (30) by suction comprise centring elements (35), borne by the support structure (32), in positions such as to insert by form coupling in respective centring seats (36) present in at least a pair of opposite edges of the nest (N), in such a way as to centre the tubular suction elements (31) with respect to the position of the "nest" (N) in the tub (T) positioned in the rest station (S) by the advancement line (L).

The frame (10) can advantageously be realised and configured in such a way as to comprise two housings (11, 12) flanked to one another.

In this case, in turn, the gripping means (30) by suction are configured in such a way that when the second frame (10) is positioned in the first operating position (P1) with the two housings (11, 12) in proximity of the rest station (S) of the advancement line (L), the gripping means (30) are able to contemporaneously collect two nests (N) from two respective tubs (T) in the rest station (S), extract them from the tubs (T) and position them respectively in the two housings (11, 12).

Correspondingly, the handling organ (M) can be configured so that, when the frame (10) with the two housings (11, 12) containing the two nests (N) is positioned in the second operating position (P2), the handling organ (M) is able to collect and extract groups of pharmaceutical containers (F) contemporaneously from the two nests (N) so as to empty the nests at the same time.

The gripping means (30) by suction are further configured in such a way that, when the frame (10) with the two nests (N) emptied of the pharmaceutical containers (F) is newly brought into the first operating position (P1), the gripping means (30) are activatable to grip by suction the two emptied nests (N), extract them from the relative housings (11, 12) and reposition them in the two tubs (T) on the advancement line (L) from which they had previously been extracted.

In a further advantageous aspect, with the purpose of increasing productivity and making available pharmaceutical containers to be filled at high frequency, the apparatus can be configured and realised in such a way that it can further comprise a second frame (20), in turn comprising at least a housing (21).

In this case, the second frame (20) is configured and predisposed to be activatable in rotation about the first rotation axis (R1) at the same time as the frame (10), so that when the frame (10) is positioned in the first operating position (P1), the second frame (20) is positioned in the second operating position (P2) (see for example figures from 7 to 9) and vice versa, when the frame (10) is positioned in the first operating position (P1), the second frame (20) is positioned in the second operating position (P2) (see for example figures from 1 to 5).

In this way, with this particular set-up of the apparatus with two frames, while the handling organ empties the nest and transfers the pharmaceutical containers to be filled to the filling station, the nests can be returned, already emptied, into the tubs from which they had been extracted, and can pick up other nests containing pharmaceutical containers to be filled from the tubs positioned by the advancement line (L) in the rest station (S).

In fact, thanks to this special set-up of the apparatus (100):
when the frame (10) with the nest containing the pharmaceutical containers (F) is positioned in the second operating position (P2) and the handling organ (M) is activated to collect the pharmaceutical containers (F), the second frame (20) is positioned in the first operating position (P1), the gripping means (30) by suction being activatable to collect at least a further nest (N) containing pharmaceutical containers (F) from a further tub (T) positioned in the rest station (S) of the advancement line (L) and to position the further nest (N) in the housing (21) of the second frame (20) stationary in the first operating position (P1) (see for example figures from 7 to 9),
while when the frame (10), bearing the nest emptied of the pharmaceutical containers is newly positioned in the first operating position (P1), the gripping means (30) by suction being activated to collect the nest emptied from the frame (10) and to reposition it in the tub on the advancement line (L) from which it was previously extracted (see figures from 11 to 13), and therefore, subsequently, to collect a further nest (N) with pharmaceutical containers (F) from another tub in the rest station (S) and transfer and position the further nest (N) in the housing (11) of the frame (10) stationary in the first operating position (P1) (figures from 1 to 5), the second frame (20), bearing a nest with pharmaceutical containers (F), is positioned in the second operating position (P2), so that the handling organ (M) can be activated to extract groups of pharmaceutical containers (F) from the nest (N) present in the housing (21) of the second frame (20) up to emptying the nest (see for example figures from 11 to 13).

In particular, as in the case of the frame (10), the second frame (20) is also configured and predisposed to be activatable in rotation about a third rotation axis (R3), parallel to the first rotation axis (R1), in such a way that, when it is set in rotation about the first rotation axis (R1) in order to be positioned in the first operating position (P1) or the second operating position (P2), the second frame (20) remains parallel and keeps the same orientation with respect to the first rotation axis (R1).

In this regard, the second frame (20) is borne by the same pair of arms (15), to which the frame (10) is rotatably coupled, and which are mounted rotatably on the support element (16).

Figure 11:
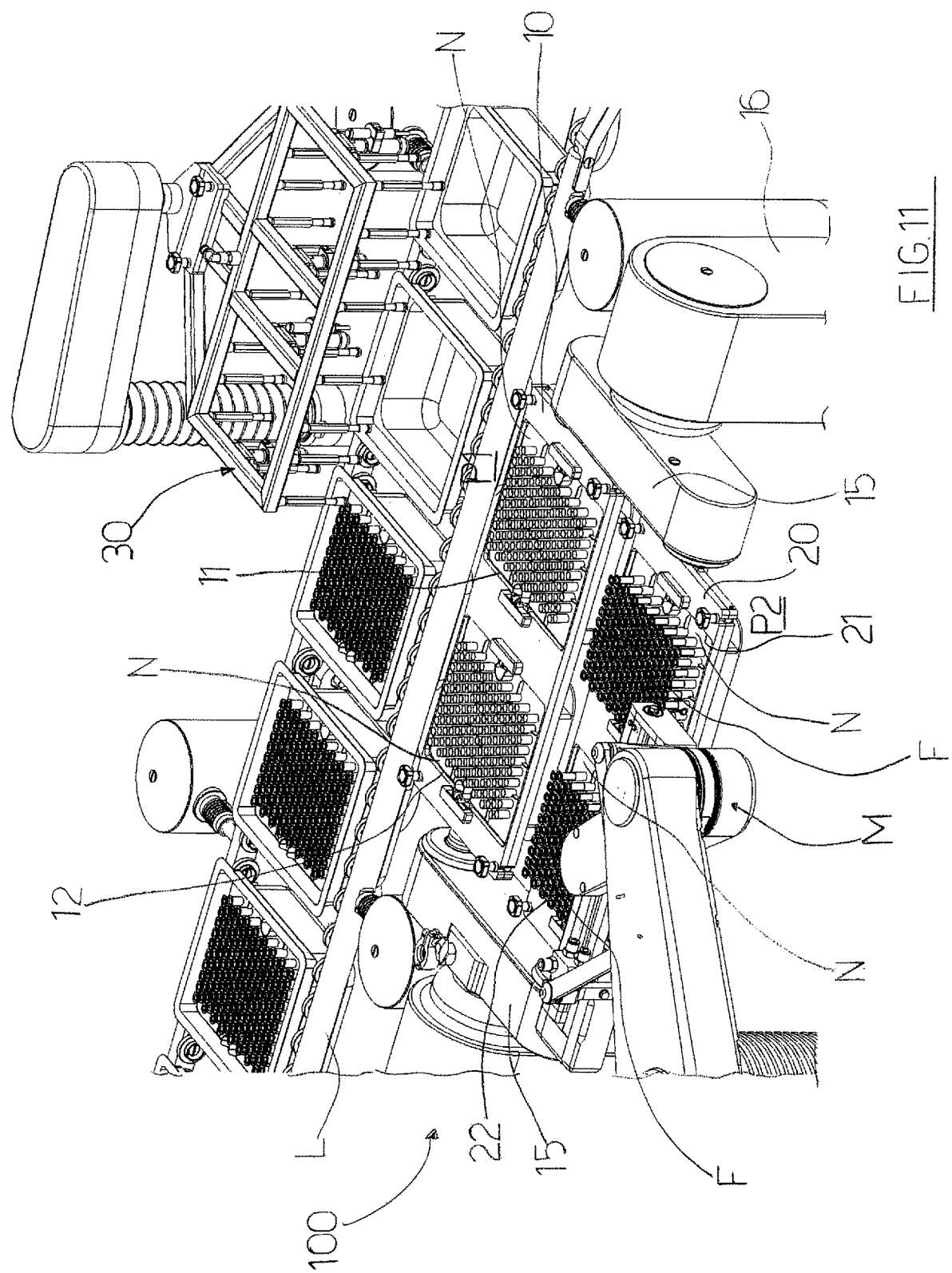

In this way, the pair of arms (15) is activatable in rotation with respect to the support elements (16) about the first rotation axis (R1) in such a way as to activate the frame (10) and the second frame (20) in rotation about the first rotation axis (R1) and move the frame (10) from the first operating position (P1) to the second operating position (P2) and, at the same time, the second frame (20) from the second operating position (P2) to the first operating position (P1) (see for example FIGS. 6 and 7), and vice versa, the frame (10) from the second operating position (P2) to the first operating position (P1) and the second frame (20) from the first operating position (P1) to the second operating position (P2) (see FIGS. 10 and 11).

In particular, the second frame (20) is mounted on the pair of arms (15) in such a way as to be rotatable with respect to the pair of arms (15) according to the third rotation axis (R3), so that, during the movement from the first operating position (P1) to the second operating position (P2), and vice versa, the second frame (20), and therefore the relative housing (21), remains parallel and keeps the same orientation with respect to the first rotation axis (R1).

In more detail, the frame (10) is activated in rotation about the first rotation axis (R1) in order to be moved from the first operating position (P1) to the second operating position (P2) and carry the nests with the pharmaceutical containers to be filled in proximity of the handling organ (M), being first raised and then lowered, the second frame (20) is activated in rotation about the first rotation axis (R1) in order to be moved from the second operating position (P2) to the first operating position (P1) so as to be first lowered and then raised, remaining below the frame(10) bearing the nests with the containers to be filled.

In this way, no element or organ in movement is passed above the pharmaceutical containers to be filled during transfer thereof in proximity of the handling organ.

Naturally, the situation is inverted when it is the second frame (20), which bears the nests with the pharmaceutical containers to be filed, that is moved from the first operating position (P1) to the second operating position (P2), while the frame (10) is moved from the second operating position (P2) to the first operating position (P1).

Correspondingly to the frame (10) the second frame (20) can also comprise a rest plane (28) predisposed inferiorly to the relative housing (21) at a distance such that, when the second frame (20) is in the first operating position (P1) and a nest (N) containing the pharmaceutical containers (F) is positioned by the gripping means (30) in the housing (21), the lower end of the pharmaceutical containers (F) abuts the rest plane (28) so that the pharmaceutical containers (F) are partially raised from the nest (N) so that an upper part thereof projects from the nest (N) to facilitate gripping thereof by the handling organ (M).

Further, the second frame (20) can comprise a matrix of centring through-seats (29) predisposed in the relative housing (21), above the rest plane (28), each of the through-seats (29) being destined to house, and enable free passage of, relative pharmaceutical containers (F) when the nest (N) containing the pharmaceutical containers (F) is positioned by the gripping means (30) in the housing (21) of the second frame (20), so as to maintain the pharmaceutical containers (F) correctly orientated during the movement of the second frame (20) from the first operating position (P1) to the second operating position (P2).

Like the frame (10) the second frame (20) can also be realised and configured so as to comprise two housings (21, 22) flanked to one another; the gripping means (30) by suction are configured in such a way that when the second frame (20) is positioned in the first operating position (P1) with the two housings (21, 22) in proximity of the rest station (S) of the advancement line (L), the gripping means (30) are able to contemporaneously collect two nests (N) from two respective tubs (T) in the rest station (S), extract them from the tubs (T) and position them respectively in the two housings (21, 22).

Lastly, in this case the handling organ (M) can be configured in such a way that when the second frame (20) with the two housings (21, 22) containing the two nests (N) with the pharmaceutical containers is brought into the second operating position (P2), the handling organ (M) is able to collect and extract groups of pharmaceutical containers (F) contemporaneously from the two nests (N) so as to empty the nests at the same time, and wherein the gripping means (30) by suction are further configured in such a way that, when the second frame (20) with the two nests (N) emptied of the pharmaceutical containers (F) is newly brought into the first operating position (P1), the gripping means are activatable to grip by suction the two emptied nests (N), extract them from the relative housings (21, 22) and reposition them in the two tubs (T) on the advancement line (L) from which they had previously been extracted.

In a case where both the frame (10) and the second frame (20) are made and configured in such a way as each to comprise two housings, the two frames will have a corresponding rest plane for each of the two housings and a matrix of through-seats for each of the two housings.

The following description is a possible operating sequence of the functioning of the apparatus of the invention, in the preferred embodiment illustrated in the figures with two frames and with each of the two frames being provided with two relative housings, taking as a reference the starting situation illustrated in FIG. 1, in which the advancement line (L) will have advanced, and halted in the rest station (S), two tubs with the relative nests internally thereof which bear pharmaceutical containers (F) that are to be filled, with the mouths thereof facing upwards.

Upstream, prior to being positioned on the advancement line (L), the tubs have been appropriately extracted from the packs (casings) thereof and the film covering them, for protecting the pharmaceutical containers, removed.

The frame (10) with the two empty housings (11, 12) is in the first operating position (P1), while the second frame (20) with the relative two empty housings (21, 22) is in the second operating position (P2).

Figure 5:
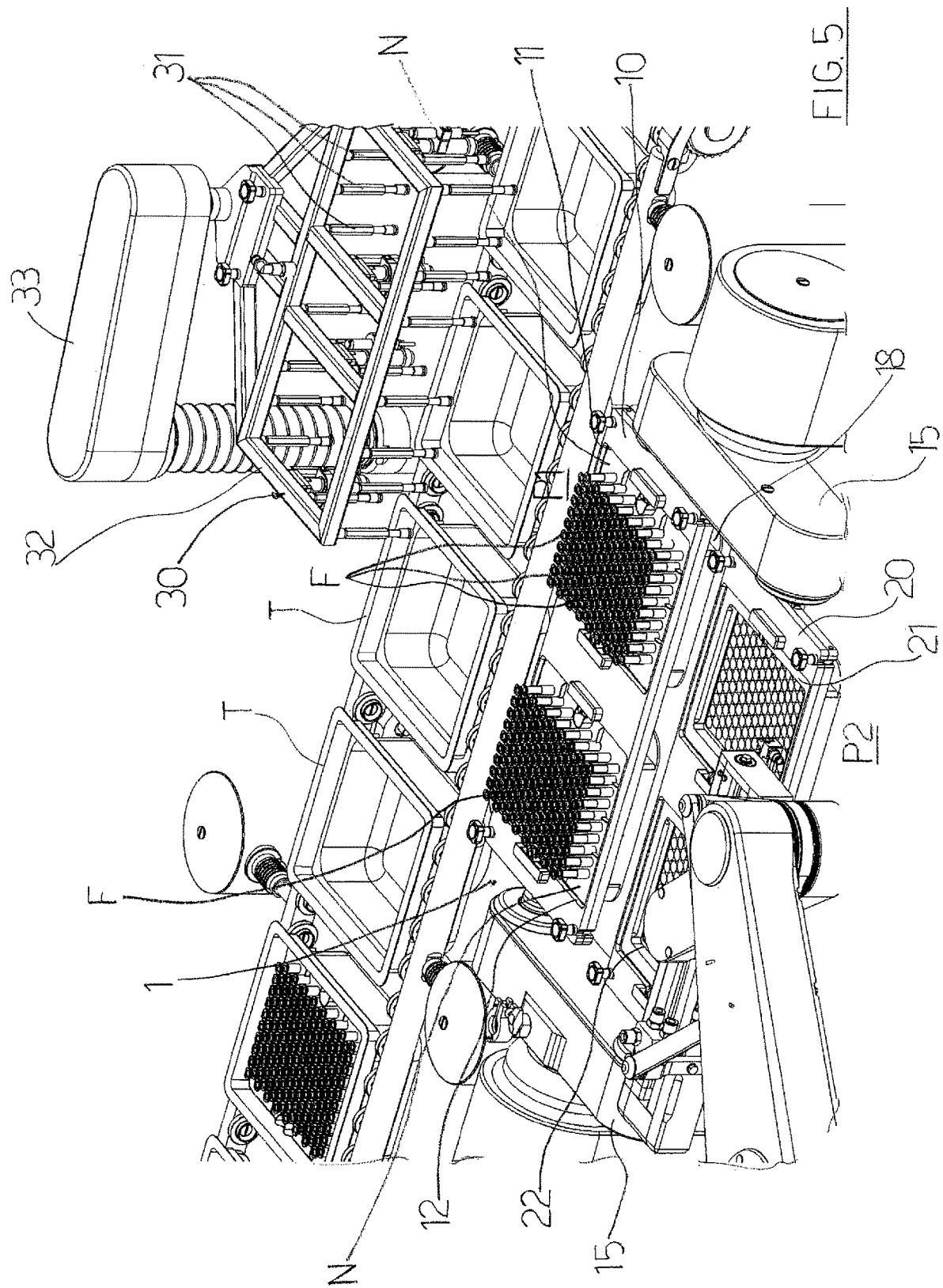

The gripping means (30) by suction are moved and activated in such a way as to pick up by suction two nests (N) containing pharmaceutical containers to be filled, from two relative tubs (N) in the rest station (S) and transfer them and position them in the two housings (11, 12) of the frame (10) (sequence of figures from 2 to 4), then to be distanced itself (FIG. 5).

The two housings (11, 12) support the nests, while the pharmaceutical containers (F), having the two lower ends abutting the rest planes present below the housings, are partly raised with respect to the nests with the upper part thereof projecting beyond the nests (FIG. 5).

At this point the frame (10) and the second frame (20) are activated in rotation about the first rotation axis (R1), so that the frame (10) is first raised and then lowered, and the second frame (20) first lowered and then raised, so as to be positioned respectively in the second operating position (P2) and the first operating position (P1) (see FIG. 6 and then FIG. 7, where the frame (10) with the two nests containing the pharmaceutical containers in the relative two housings (11, 12), is in the second operating position (P2) in proximity of the handling organ (M), while the second frame (20) with the two relative empty housings (21, 22) in the first operating position (P1) is in proximity of the rest station (S)).

During the rotation about the first rotation axis (R1), the frame (10) is further activated in rotation about the second rotation axis (R2) so that it, and therefore the housings with the nests, remains parallel and maintains the same orientation with respect to the first rotation axis (R1), so that in the same way and with the same purpose the second frame (20) is activated in rotation about the third rotation axis (R3) (situation illustrated in FIG. 6).

As mentioned in the foregoing, in order to perform these rotations and movements of the two frames, the pair of arms (15) is activated in rotation in a same predetermined rotation direction about the first rotation axis (R1) with respect to the two support elements (16) to which they are rotatably constrained, and the frame (10) will rotate with respect to the pair of arms (15) about the second rotation axis (R2) and the second frame (20) will rotate with respect to the pair of arms (15) about the third rotation axis (R3) (situation illustrated in FIG. 6).

In the meantime, the advancement line (L) will have advanced the tubs arranged thereon so that another two tubs, with the nests inside them containing pharmaceutical containers to be filled, will be positioned in the rest station (S), while the two tubs previously emptied of the nests are positioned in a position downstream that is advanced with respect to the rest station (S).

Figure 9:
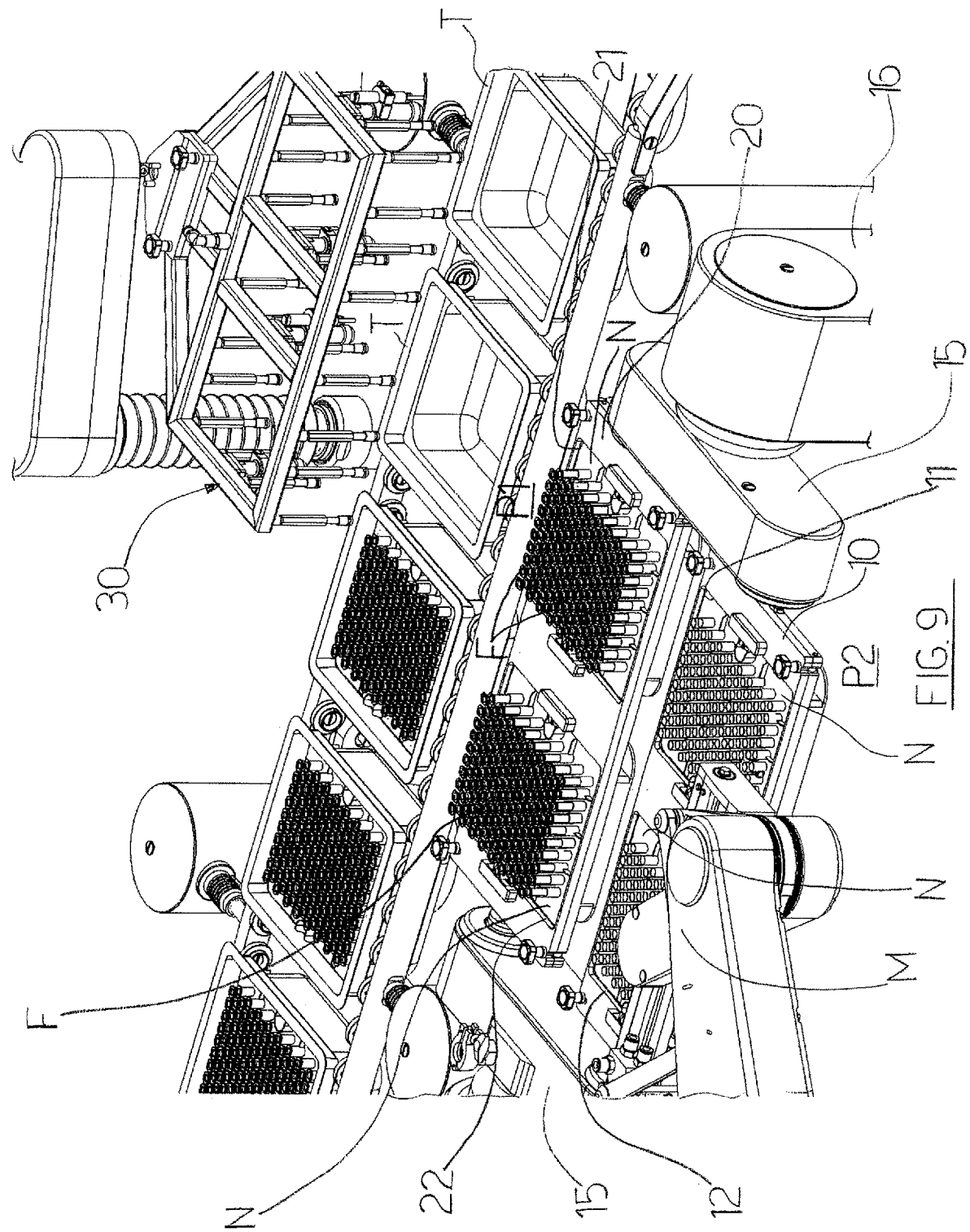

At this point, while the handling organ (M) starts to pick up groups of pharmaceutical containers (F) from the two nests present in the two housings (11, 12) of the frame (10) that is stationary in the second operating position (P2), the gripping means (30) by suction are activated to collect two nests (N) containing pharmaceutical containers (F) to be filled from the two tubs (T) in the rest station (S) (FIG. 7) and transfer them in the two housings (21, 22) of the second frame (20), stationary in the first operating position (P1) (FIG. 8), then to be distanced (FIG. 9).

Once the two nests present in the housings (11, 12) of the frame (10) stationary in the second operating position (P2) have been completely emptied by the handling organ (M), and the pharmaceutical containers which were present therein have all been transferred to the filling station, the frame (10) and the second frame (20) are activated in rotation about the first rotation axis (R1), always in the same predetermined rotation direction (the pair of arms (15) is activated in rotation about the first rotation axis (R1) with respect to the two support elements (16)) (see FIG. 10), until the frame (10), with the nests emptied, is newly positioned in the first operating position (P1) and the second frame (20), with the nests containing the pharmaceutical containers to be filled, is positioned in the second operating position (P2) in proximity of the handling organ (M) (see FIG. 11).

In this case too, during the movement from the second operating position (P2) to the first operating position (P1), the frame (10) is activated in rotation about the second rotation axis (R2) (with respect to the pair of arms (15)), so that it remains parallel and keeps the same orientation with respect to the first rotation axis (R1), and likewise the second frame (20), during the movement from the first operating position (P1) to the second operating position (P2), is activated in rotation about the third rotation axis (R3) (with respect to the pair of arms (15)), so that it remains parallel and keeps the same orientation with respect to the first rotation axis (R1).

The second frame (20) containing the nests with the pharmaceutical containers to be filled, during the movement from the first operating position (P1) to the second operating position (P2), is first raised and then lowered, while the frame (10), during the movement from the second operating position (P2) to the first operating position (P1) is first lowered and then raised.

In this way, the nests which carry the containers to be filled will always move above the nests that have already been emptied, in such a way as to prevent any possible causes of contamination that might occur in the case of movement of objects or organs above the pharmaceutical containers.

Figure 12:
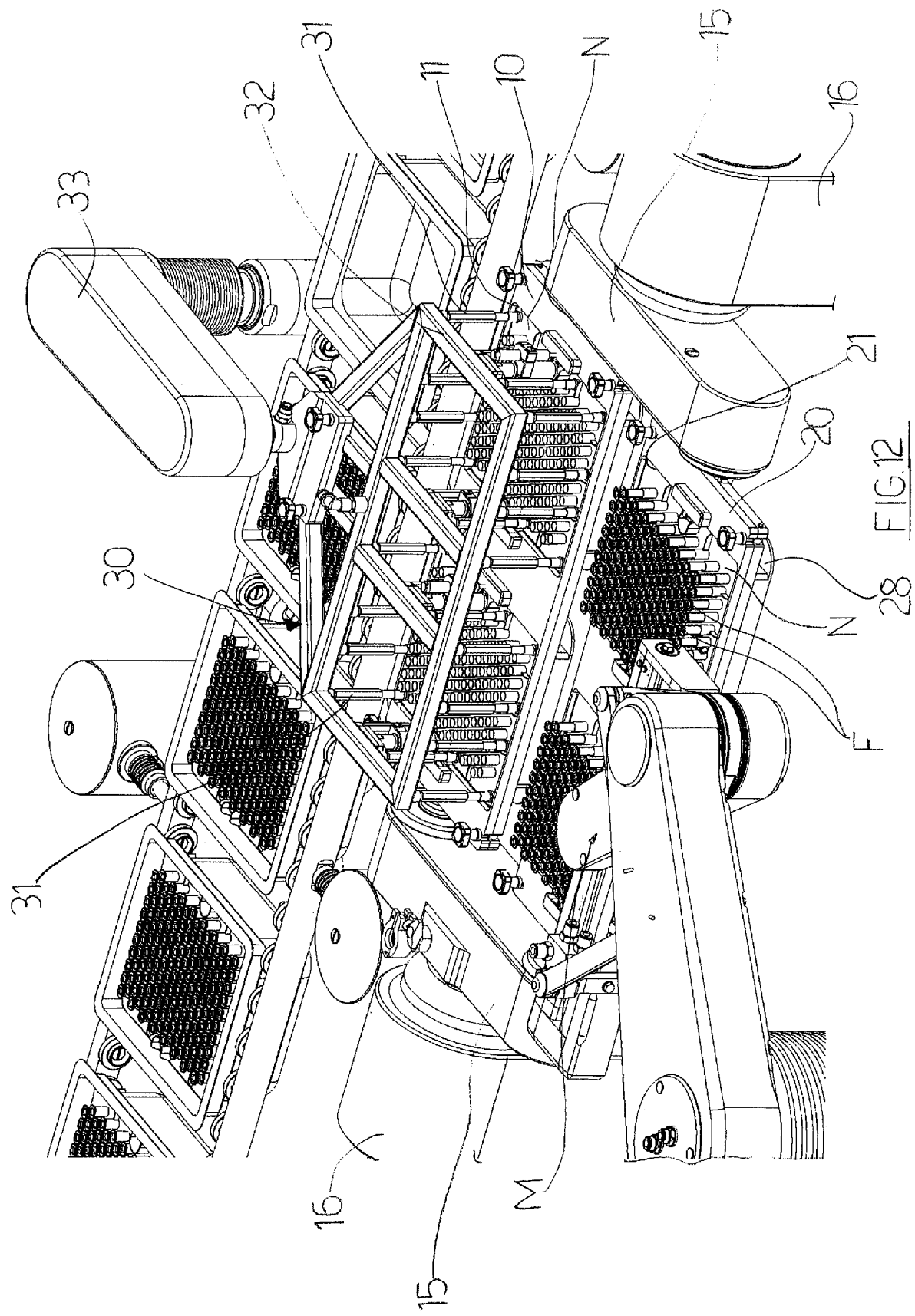

Having reached this situation, illustrated in FIG. 12, the handling organ (M) starts to pick up groups of pharmaceutical containers (F) from the two nests present in the two housings (21, 22) of the second frame (20) that is stationary in the second operating position (P2), while the gripping means (30) are activated to pick up the two emptied nests present in the housings (11, 12) of the frame (10) that is stationary in the first operating position (P1) (see FIG. 12), and to transfer them and reposition them in the two tubs from which they had previously been extracted, which tubs are located on the advancement line (L) downstream of the rest station (S) (see FIG. 13).

The sequence described above will now be cyclically repeated.

The invention claimed is:

1. An apparatus for extracting pharmaceutical containers to be filled from relative support elements constituted by a nest arranged internally of a tub, wherein the pharmaceutical containers have respective mouths for insertion of a pharmaceutical substance or product and are arranged and supported by the nest with the respective mouths for insertion of a pharmaceutical substance or product facing upwards, the apparatus comprising:

an advancement line, for advancing the tubs, with the nests inside them containing the pharmaceutical containers, and for stopping the tubs at a rest station;

a handling organ;

a pickup and transfer station, for picking up the nests containing the pharmaceutical containers from the tubs which have been positioned by the advancement line in the rest station, wherein the pickup and transfer station comprises:

at least a frame conformed as to have at least a housing having a shape and dimensions to be able to receive and support a nest with the pharmaceutical containers inside, the frame being predisposed to be activatable in rotation about a first rotation axis in order to be positionable in a first operating position, in which the housing is situated in proximity of the rest station of the advancement line, and in a second operating position in which the housing is in proximity of the handling organ, gripping means by suction, configured to collect, by suction, at least a nest containing the pharmaceutical containers from a relative tub positioned by the advancement line at the rest station, the gripping means by suction are further configured and activatable, when the frame is positioned in the first operating position, in order to extract, gripping by suction, the nest containing the pharmaceutical containers from the tub and to transfer, position and release the nest in the housing of the frame, with the frame, once the gripping means have positioned and released the nest containing the pharmaceutical containers in the housing, being activatable in rotation about the first rotation axis so as to be positioned in the second operating position so that the housing, with the nest containing the pharmaceutical containers, is in proximity of the handling organ, the frame also being configured and predisposed so that, during the rotation about the first rotation axis from the first operating position to the second operating position, the frame can also be set in rotation about a second rotation axis parallel to the first rotation axis, so that the housing, and therefore the nest containing the pharmaceutical containers, remains parallel to and constantly maintains a same orientation with respect to the first rotation axis during the displacement from the first operating position to the second operating position, and wherein the handling organ is predisposed and configured to grip, handle, move and release the pharmaceutical containers, so that, when the frame has been positioned in the second operating position with the relative housing containing the nest with the pharmaceutical containers, the handling organ can be activatable to grip a group of pharmaceutical containers and extract them from the nest and repeat such operations up to completely emptying the nest, wherein the frame, in order to be movable from the first operating position to the second operating position, is configured to be activatable about the first rotation axis according to a curved trajectory with a prefixed rotation direction so that the frame, and therefore the housing with nest containing the pharmaceutical containers, is first raised with respect to the advancement line and then lowered, in order to be positioned in the second operating position in proximity of the handling organ.

2. The apparatus as claimed in claim 1, wherein the frame, in order to be movable from the second operating position to the first operating position, after the handling organ has collected all the pharmaceutical containers and emptied the nest borne by the housing of the frame positioned in the second operating position, is configured to be activatable about the first rotation axis always in the prefixed rotation direction according to a curved trajectory so that the frame, and therefore the housing with the emptied nest, is first lowered and then raised so as to be positioned in the first operating position in proximity of the rest station of the advancement line, and wherein the gripping means by suction, when the frame with the housing containing the emptied nest is returned into the first operating position, are further configured to be activatable to grip by suction the emptied nest, extract it from the housing and reposition it in the tub on the advancement line from which it had previously been extracted.

3. The apparatus as claimed in claim 1, wherein the frame is borne by a pair of arms, the pair of arms being rotatably mounted on relative support elements so that the pair of arms is activatable in rotation with respect to the support elements about the first rotation axis so that, with the rotation of the pair of arms with respect to the support elements, the frame can be activated in rotation about the first rotation axis and moved from the first operating position to the second operating position and vice versa, and wherein the frame is mounted on the pair of arms to be rotatable with respect to the pair of arms according to the second rotation axis, so that, during the movement from the first operating position to the second operating position, and vice versa, the frame, and therefore the relative housing, remains parallel and keeps the same orientation with respect to the first rotation axis.

4. The apparatus as claimed in claim 3, wherein the second frame is also borne by the pair of arms mounted rotatably on the support elements, the pair of arms being activatable in rotation with respect to the support elements about the first rotation axis to activate the frame and the second frame in rotation about the first rotation axis and move the frame from the first operating position to the second operating position and, at the same time, the second frame from the second operating position to the first operating position, and vice versa, and wherein the second frame is mounted on the pair of arms to be rotatable with respect to the pair of arms according to the third rotation axis, so that, during the movement from the first operating position to the second operating position, and vice versa, the second frame, and therefore the relative housing, remains parallel and keeps the same orientation with respect to the first rotation axis.

5. The apparatus as claimed in claim 1, wherein the frame comprises a rest plane predisposed inferiorly of the housing at a distance so that, when the frame is in the first operating position and the nest containing the pharmaceutical containers is positioned by the gripping means in the housing, the lower end of the pharmaceutical containers abuts the rest plane so that the pharmaceutical containers are partially raised with respect to the nest so that an upper part thereof projects from the nest to facilitate gripping thereof by the handling organ.

6. The apparatus as claimed in claim 5, wherein the frame comprises a matrix of centering through-seats predisposed in the housing, above the rest plane, each of the through-seats being destined to house, and enable free passage of, relative pharmaceutical containers when the nest containing the pharmaceutical containers is positioned by the gripping means in the housing of the frame, so as to maintain the pharmaceutical containers correctly orientated during the movement of the frame from the first operating position to the second operating position.

7. The apparatus as claimed in claim 1, wherein the gripping means by suction comprise a series of tubular suction elements, which are borne by a support structure activatable and movable in space by means of a movable arm, the tubular suction elements being borne by the support structure so as to be arranged in an orientation and arrangement to be able to act at the peripheral edges of the nests for gripping them by suction.

8. The apparatus as claimed in claim 7, wherein the gripping means by suction comprise centering elements, borne by the support structure, in positions to insert by form coupling in respective centering seats present in at least a pair of opposite edges of the nest to center the tubular suction elements with respect to the position of the "nest" in the tub positioned in the rest station by the advancement line.

9. The apparatus as claimed in claim 1, wherein: the frame comprises two housings flanked to one another; the gripping means by suction, when the frame is positioned in the first operating position with the two housings in proximity of the rest station of the advancement line, are configured to contemporaneously collect two nests from two respective tubs in the rest station, extract them from the tubs and position them respectively in the two housings; the handling organ is configured so that, when the frame with the two housings containing the two nests is positioned in the second operating position, the handling organ is able to collect and extract groups of pharmaceutical containers contemporaneously from the two nests so as to empty the nests at the same time, and wherein the gripping means by suction, when the frame with the two nests emptied of the pharmaceutical containers is newly brought into the first operating position, are further configured to be activatable to grip by suction the two emptied nests, extract them from the relative housings and reposition them in the two tubs on the advancement line from which they had previously been extracted.

10. The apparatus as claimed in claim 1, further comprising a second frame, including at least a housing, configured and predisposed to be activatable in rotation about the first rotation axis contemporaneously with the frame, so that when the frame is positioned in the first operating position, the second frame is positioned in the second operating position, and vice versa, when the frame is positioned in the first operating position, the second frame is positioned in the second operating position, so that:

when the frame with the nest containing the pharmaceutical containers is positioned in the second operating position and the handling organ is activated to collect the pharmaceutical containers, the second frame is positioned in the first operating position, the gripping means by suction being activatable to collect at least a further nest containing pharmaceutical containers from a further tub positioned in the rest station of the advancement line and to position the further nest in the housing of the second frame stationary in the first operating position, and when the frame, bearing the nest emptied of the pharmaceutical containers is newly positioned in the first operating position, the gripping means by suction being activated to collect the nest emptied from the frame and to reposition it in the tub on the advancement line from which it was previously extracted, and therefore, subsequently, to collect a further nest with pharmaceutical containers from another tub in the rest station and transfer and position the further nest in the housing of the frame stationary in the first operating position, the second frame, bearing a nest with pharmaceutical containers, is positioned in the second operating position, so that the handling organ can be activated to extract groups of pharmaceutical containers from the nest present in the housing of the second frame up to emptying the nest.

11. The apparatus as claimed in claim 10, wherein the second frame is configured and predisposed also to be activatable in rotation about a third rotation axis, parallel to the first rotation axis, so that, when the second frame is set in rotation about the first rotation axis in order to be positioned in the first operating position or the second operating position, the second frame remains parallel and keeps the same orientation with respect to the first rotation axis.

12. The apparatus as claimed in claim 10, wherein the second frame is also borne by the pair of arms mounted rotatably on the support elements, the pair of arms being activatable in rotation with respect to the support elements about the first rotation axis to activate the frame and the second frame in rotation about the first rotation axis and move the frame from the first operating position to the second operating position and, at the same time, the second frame from the second operating position to the first operating position, and vice versa, and wherein the second frame is mounted on the pair of arms to be rotatable with respect to the pair of arms according to the third rotation axis, so that, during the movement from the first operating position to the second operating position, and vice versa, the second frame, and therefore the relative housing, remains parallel and keeps the same orientation with respect to the first rotation axis.

13. The apparatus as claimed in claim 10, wherein the second frame comprises a rest plane predisposed inferiorly to the relative housing at a distance so that, when the second frame is in the first operating position and a nest containing the pharmaceutical containers is positioned by the gripping means in the housing, the lower end of the pharmaceutical containers abuts the rest plane so that the pharmaceutical containers are partially raised from the nest so that an upper part thereof projects from the nest to facilitate gripping thereof by the handling organ.

14. The apparatus as claimed in claim 13, wherein the second frame comprises a matrix of centering through-seats predisposed in the relative housing, above the rest plane, each of the through-seats being destined to house, and enable free passage of, relative pharmaceutical containers when the nest containing the pharmaceutical containers is positioned by the gripping means in the housing of the second frame, so as to maintain the pharmaceutical containers correctly orientated during the movement of the second frame from the first operating position to the second operating position.

15. The apparatus as claimed in claim 14, wherein: the second frame comprises two housings flanked to one another; the gripping means by suction are configured so that when the second frame is positioned in the first operating position with the two housings in proximity of the rest station of the advancement line, the gripping means are able to contemporaneously collect two nests from two respective tubs in the rest station, extract them from the tubs and position them respectively in the two housings; the handling organ is configured so that, when the second frame with the two housings containing the two nests is brought into the second operating position, the handling organ is able to collect and extract groups of pharmaceutical containers contemporaneously from the two nests so as to empty the nests at the same time, and wherein the gripping means by suction are further configured so that, when the second frame with the two nests emptied of the pharmaceutical containers is newly brought into the first operating position, the gripping means are activatable to grip by suction the two emptied nests, extract them from the relative housings and reposition them in the two tubs on the advancement line from which they had previously been extracted.

16. An apparatus for extracting pharmaceutical containers to be filled, from relative support elements constituted by a nest arranged internally of a tub, wherein the pharmaceutical containers have respective mouths for insertion of a pharmaceutical substance or product and are arranged and supported by the nest with the respective mouths for insertion of a pharmaceutical substance or product facing upwards, the apparatus comprising:
  an advancement line, for advancing the tubs, with the nests inside them containing the pharmaceutical containers, and for stopping the tubs at a rest station;
  a handling organ;
  a pickup and transfer station, for picking up the nests containing the pharmaceutical containers from the tubs which have been positioned by the advancement line in the rest station,
  wherein the pickup and transfer station comprises:
  a frame conformed to have at least a housing having a shape and dimensions to be able to receive and support a nest with the pharmaceutical containers inside, the frame being predisposed to be activatable in rotation about a first rotation axis in order to be positionable in a first operating position, in which the housing is situated in proximity of the rest station of the advancement line, and in a second operating position in which the housing is in proximity of the handling organ,
  gripping means by suction, configured to collect, by suction, at least a nest containing the pharmaceutical containers from a relative tub positioned by the advancement line at the rest station, the gripping means by suction are further configured and activatable, when the frame is positioned in the first operating position, in order to extract, gripping by suction, the nest containing the pharmaceutical containers from the tub and to transfer, position and release the nest in the housing of the frame,
  with the frame, once the gripping means have positioned and released the nest containing the pharmaceutical containers in the housing, being activatable in rotation about the first rotation axis so as to be positioned in the second operating position so that the housing, with the nest containing the pharmaceutical containers, is in proximity of the handling organ,
  wherein the handling organ is predisposed and configured to grip, handle, move and release the pharmaceutical containers, so that, when the frame has been positioned in the second operating position with the relative housing containing the nest with the pharmaceutical containers, the handling organ can be activatable to grip a group of pharmaceutical containers and extract them from the nest and repeat such operations up to completely emptying the nest,
  wherein the frame is configured and predisposed so that, during the rotation about the first rotation axis from the first operating position to the second operating position, the frame is also set in rotation about a second rotation axis parallel to the first rotation axis, so that the housing, and therefore the nest containing the pharmaceutical containers, remains parallel to and constantly maintains a same orientation with respect to the first rotation axis during the displacement from the first operating position to the second operating position.

* * * * *